Figures 1, 2:

(No Model.)

B. H. HARRIS & G. A. CORBIN.
SPACING RULE AND LINING GAGE.

No. 573,973.  Patented Dec. 29, 1896.

Witnesses
Jas. H. Blackwood
H. N. Loeis

Bret H. Harris
George A. Corbin
Inventors
by
Walter T. Rogers,
Attorney

UNITED STATES PATENT OFFICE.

BRET H. HARRIS AND GEORGE A. CORBIN, OF DENVER, COLORADO.

SPACING-RULE AND LINING-GAGE.

SPECIFICATION forming part of Letters Patent No. 573,973, dated December 29, 1896.

Application filed October 18, 1895. Serial No. 566,154. (No model.)

*To all whom it may concern:*

Be it known that we, BRET H. HARRIS and GEORGE A. CORBIN, citizens of the United States, residing at Denver, in the county of Arapahoe and State of Colorado, have invented a new and useful Spacing-Rule and Lining-Gage, of which the following is a specification.

Our invention consists of a ruler having measuring-guides and corresponding indicia representing standard types and arbitrary variations thereof; and its object is to provide a ruler by which printers, draftsmen, engravers or others may at once measure types or letters and rule the space or guide lines therefor.

The drawings present a diagram of the relations of the guide or space lines to the certain known types and also indicate the manner of using the ruler so as to measure and rule letters or characters of unclassified dimensions.

In the drawings, Figure 1 is a plan view of the ruler, and Fig. 2 is a transverse section thereof.

The ruler is preferably made of some light thin material, such, for example, as celluloid or rubber, and it preferably bears upon one face at the end the names of the standard types from "brilliant" to "English." Opposite each name is a slit extending nearly to the end of the ruler. The slits themselves or the distance from slit to slit may constitute the units of measurement, or both may be arranged upon a definite plan to permit of combinations, permutations, and sequences of scales.

At one end of the ruler we have shown a series of vertical lines numbered, in this instance, from "12" to "44," the preceding numbers being employed to designate the graduated spaces between the slits. These lines, it will be observed, are arranged in such successive order and numbers as to offer the widest range of gradation and standards of measurement for any possible dimension in letters or characters. They constitute indicia for combinations, sequences, or permutations of the slits and distances whereby measurements may be made which are multiples or arrangements of distances between the slits or from an edge of one slit to an edge of another, and each number may designate and each corresponding line may measure the width or height of some unusual or arbitrary character or sign, as, for example, the types double English, double great primer, excelsior, emerald, minionette, ruby, canon, Columbian, paragon, &c., or, for example, letters used in various kinds of sign-boards.

It is obvious that the ruler may be used as a universal character-measure, but it is especially devised for ruling. When so used, a wedge-pointed pencil or similar tool is drawn along the borders of a slit which represents the desired dimensions. In determining the relative elevation of the lines, for example, the upper and lower edge of a slit may serve as guides in turn, or one slit may determine the position of one line and other slits at the desired distances apart may furnish the complementary guides. It may be noted also that in refinements of scaling one edge of one slit and the opposing edge of another slit may determine the limits of the measurement and that in this way variations may be added to the many combinations more clearly defined. The rule is, in short, adapted to meet any contingency of scaling or measurement and apply any scheme of ruling without the necessity for a laborious preliminary measurement.

Having fully described our invention, what we claim is—

1. A spacing-rule and lining-gage having a series of slits of different and graduated widths, substantially as described.

2. A spacing-rule and lining-gage having a series of slits of different and graduated widths at different and graduated distances apart, substantially as described.

3. A spacing-rule and lining-gage having in combination the indicia of certain standard types or characters, and an equal number of slits each corresponding in width to one of the types or characters, substantially as described.

4. A spacing-rule and lining-gage having in combination a series of graduated slits at graduated distances apart, and indicia for combinations, sequences or permutations of the slits and distances, substantially as described.

BRET H. HARRIS.
GEORGE A. CORBIN.

Witnesses:
H. B. ILLIUS,
L. A. HEURICH.